United States Patent [19]
Portewig

[11] 4,097,147
[45] Jun. 27, 1978

[54] PRINT MACHINE FRAME

[76] Inventor: J. Milton Portewig, 405 E. Laburnum Ave., Richmond, Va. 23222

[21] Appl. No.: 802,392

[22] Filed: Jun. 1, 1977

[51] Int. Cl.² .................. G03B 27/30; G03B 27/02
[52] U.S. Cl. ................................. 355/106; 355/72; 355/75; 355/132
[58] Field of Search ............. 355/107, 132, 106, 72, 355/75

[56] References Cited

U.S. PATENT DOCUMENTS

| | | | |
|---|---|---|---|
| 3,044,386 | 7/1962 | Limberger | 355/107 |
| 3,058,409 | 10/1962 | Limberger | 355/107 |
| 3,092,005 | 6/1963 | Limberger | 355/107 |
| 3,211,074 | 10/1965 | Heiart et al. | 355/107 |
| 3,565,523 | 2/1971 | Davis et al. | 355/106 |
| 3,591,286 | 7/1971 | Yanagawa | 355/106 |
| 3,749,491 | 7/1973 | Maxfield et al. | 355/106 |

*Primary Examiner*—Richard A. Wintercorn
*Attorney, Agent, or Firm*—Griffin, Branigan and Butler

[57] ABSTRACT

A tray assembly to be used with a blueprint-type print machine includes an originals/print-paper tray interconnected with a copies tray. The tray assembly is constructed to position mouths of the original/print-paper tray and the copies tray at respective inlets and outlets of the print machine, with the trays being in substantially vertical attitudes. The originals/print-paper tray further includes a flat, sheet-like divider positioned therein which is freely movable between front and rear sides thereof. Adjustable guides are included at the mouths of the respective trays. A telescoping adjustable arm is connected between the lower ends of the respective trays under the print machine.

7 Claims, 6 Drawing Figures

U.S. Patent  June 27, 1978  Sheet 1 of 2  4,097,147
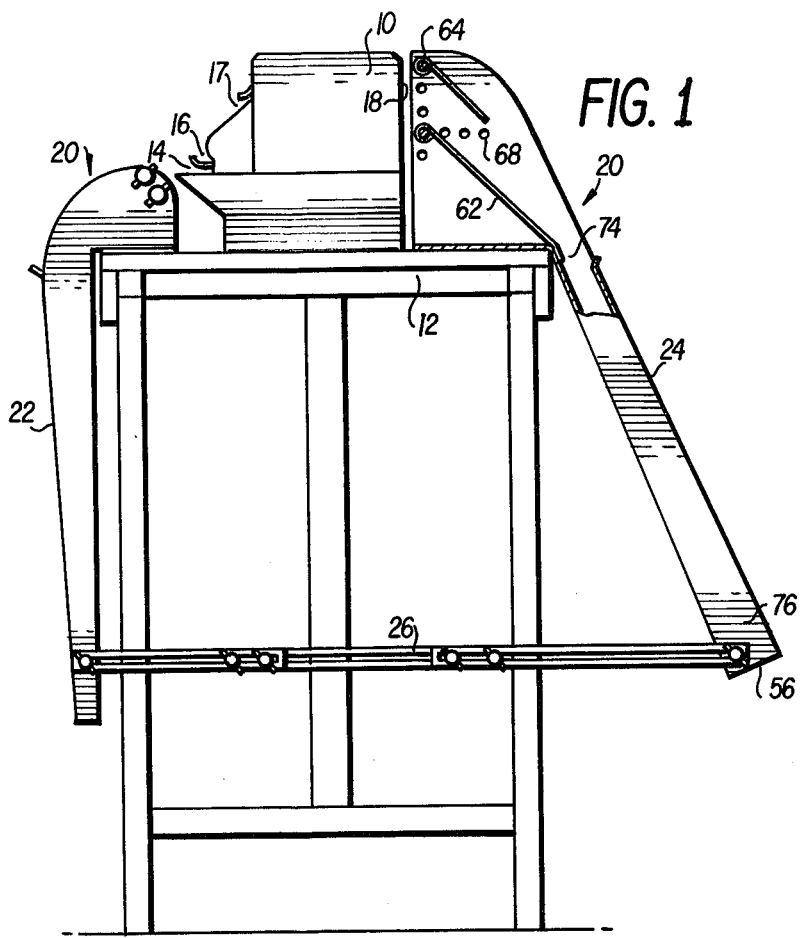
FIG. 1
FIG. 5
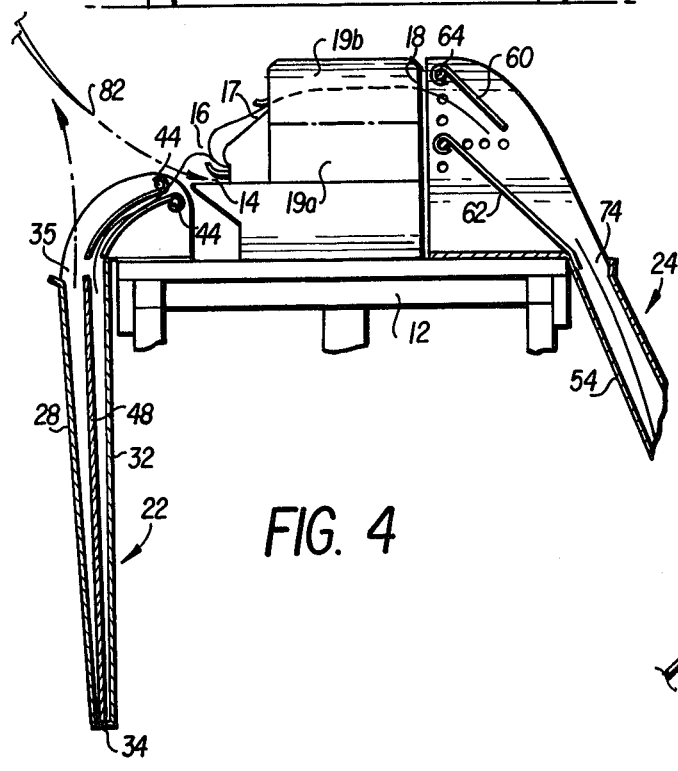
FIG. 4
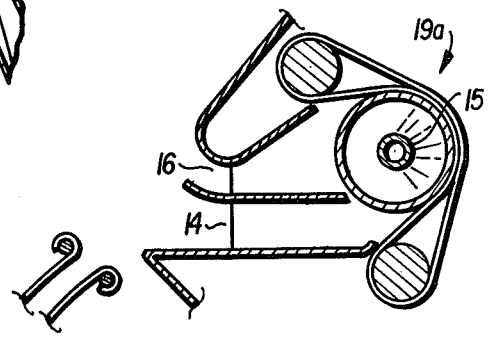
FIG. 6

PRINT MACHINE FRAME

BACKGROUND OF THE INVENTION

This invention relates broadly to the art of accessories for blueprint-type print machines, and, more specifically, to paper trays to be used with such print machines.

Print machines of the type used for copying large originals, or traces, such as for blueprints, by architects, draftsmen, and the like are normally of the contact printing type. That is, large originals, or traces, and photo-sensitive print paper are normally fed by an operator into a first inlet of the print machine together, in contact with one another, and lights, and other photo-processing equipment inside the machine expose the image of the original onto the print paper. The print machine then feeds both the original and the print paper out of a first front outlet. The operator separates the original from the print paper and feeds the print paper back into a second inlet for developing it into a blueprint. The print paper emerges from a second outlet as a printed blueprint copy.

Quite frequently, operators must make large numbers of blueprint copies of a large stack of trace originals for a building or the like. Normally, the operator places a pile of originals to be copied and a pile of print paper adjacent thereto. The operator then picks up a first original to be copied and a piece of print paper and puts them together. While holding the sheets together the operator inserts them into the first inlet of the print machine. The operator then receives these two papers from the first outlet at the front of the print machine and feeds the print paper back into the machine for development thereof. He must then retrieve the original at the front of the machine and place it in a third pile and retrieve the copy at the rear of the machine and place it in a fourth pile. If the operator desires to make more than one copy of an original, upon placing the copy in an appropriate pile and receiving the original from the first, or original, outlet, he picks up another piece of print paper, places it with the original to be copied a second time, and feeds them both into the machine as before. Again, after printing, the operator must retrieve the copy and the original from their respective outlets and organize them into piles for desired collation thereof.

The above sequence is not only painfully slow and laborious, but also tends to crease and otherwise damage the original traces, which are thin, translucent sheets. It is therefore an object of this invention to provide a print machine tray assembly which speeds up multiple copying of large sheets, such as blueprint traces and the like. It is a further object of this invention to provide a print-machine tray assembly which allows an operator to make large numbers of copies of a sheet group while receiving collated copies and maintaining the originals in their proper sequence.

It is a further object of this invention to provide a print-machine tray assembly which is uncomplicated in structure, and relatively easy to manufacture, and use.

SUMMARY OF THE INVENTION

According to principles of this invention, a print-machine tray assembly includes an originals/print-paper tray, a copies tray, and a mounting mechanism for mounting the trays on opposite sides of a print machine. The trays, when mounted, define flat, vertically-oriented, envelopes having mouths which open upwardly toward the print machine. In the case of the originals/print-paper tray, the envelope mouth is adjacent to print-machine inlets. In the case of the copies-tray envelope, the mouth is adjacent to a copy, or print, outlet. The originals/print-paper tray envelope contains a flat, sheet-like, divider positioned therein which is freely movable between front and rear sides of the envelope. Each of the trays includes adjustable guides positioned at the envelope mouths thereof.

The mounting means allows the print-machine tray assembly to be used with various size supporting tables. In this regard, the mounting mechanism includes an adjusting support arm which is attached to the lower edges of the respective trays. In a preferred embodiment, the respective trays are fastened to a table on which the print machine is mounted.

BRIEF DESCRIPTION OF THE DRAWINGS

The foregoing and other objects, features, and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a side, partially cutaway, view of a print-machine mounted on a table with a tray assembly of this invention also being mounted thereon.

FIG. 4 is a simplified, partially-sectional, view of the apparatus of FIG. 1, with the movement of sheets being diagrammatically illustrated thereon;

FIG. 5 is a simplified sectional view of the originals/print-paper tray of FIGS. 1, 2, and 4; and, FIG. 6 is a fragmented sectional view of an exposure portion of the print machine of FIG. 1.

DESCRIPTION OF THE PREFERRED EMBODIMENT

Figure 2:
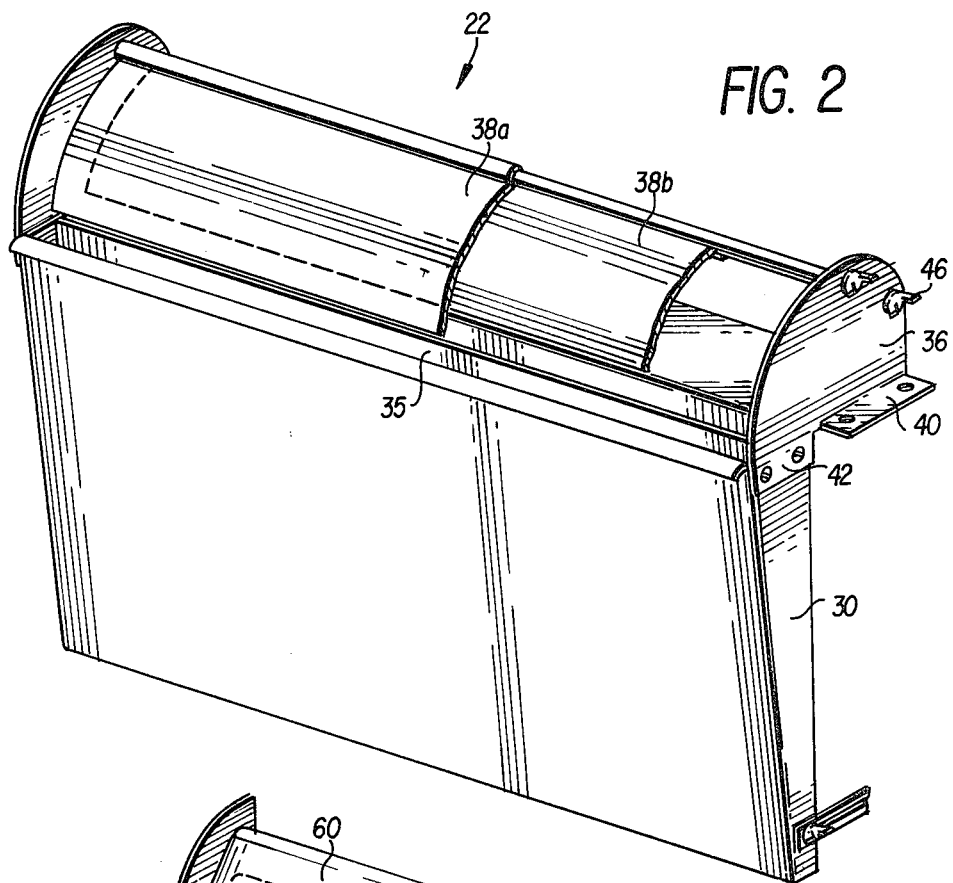
FIG. 2 is an isometric view of an originals/print-paper tray of the tray assembly of FIG. 1.
Figure 3:
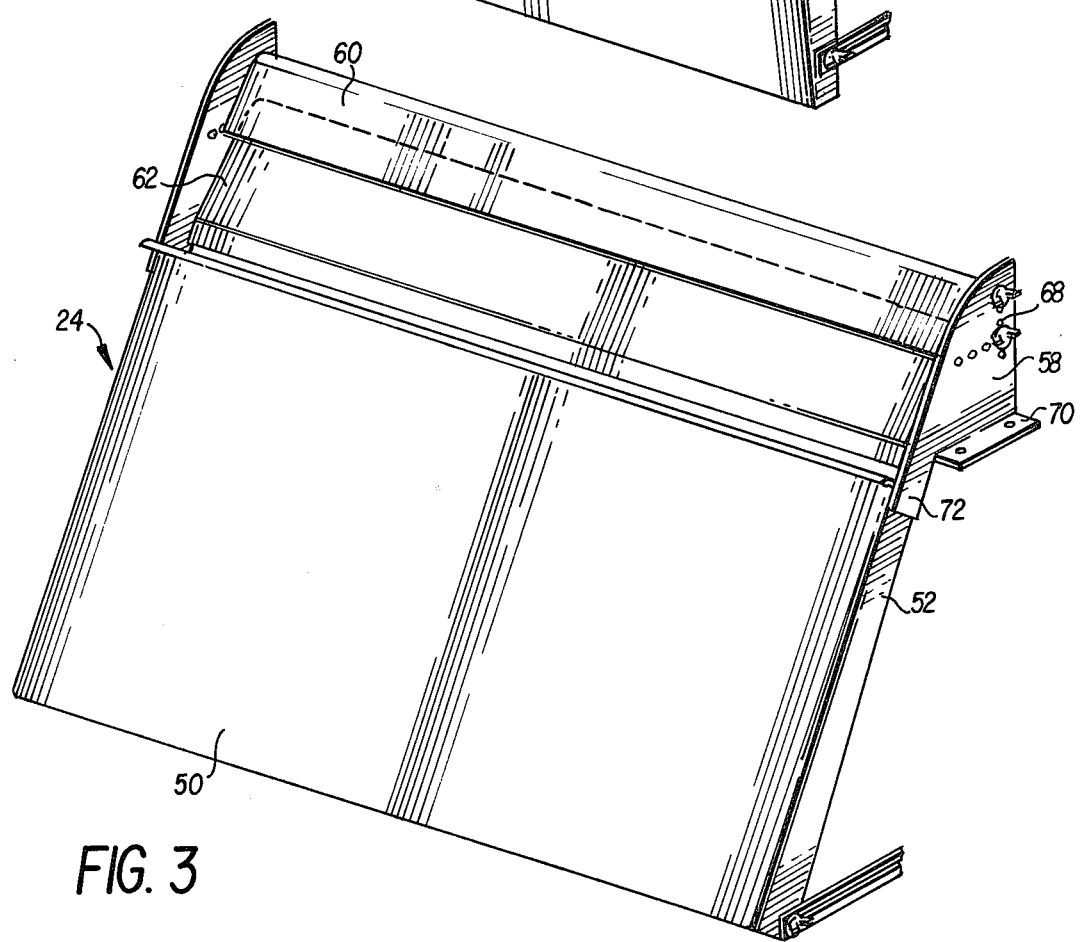
FIG. 3 is an isometric view of a copies tray of the tray assembly of FIG. 1.

Referring now to the drawings, a print machine 10 is mounted on a normal frame table 12. The print machine 10 has a first inlet 14 for receiving originals and print-paper sheets in contact with one another; a first outlet 16; a second, or developer, inlet 17; and a final copies outlet 18. Explaining briefly the operation of the print machine 10, the print machine 10 receives originals superimposed on print-paper sheets at the first inlet 14, and exposes these two sheets to a lamp 15 in an exposure portion 19a of the print machine 10. The print machine 10 then ejects the originals and the exposed print-paper sheets at the first outlet 16. An operator must separate the originals from the print-paper sheets and feed the print-paper sheets into the second inlet 17 where the transferred images are developed on the print-paper sheets in a developing portion 19b of the print machine 10 by means of application of ammonia or the like. The print machine 10 ejects the thusly developed copies at the copies outlet 18. It should be noted that both inlets 14 and 17 and the first outlet 16 are located at the front of the print machine 10 while the second, or copies, outlet 18 is located at the rear of the print machine 10. Such print machines are common in the art and are well known by architects, draftsmen and other designers. Two such print machines have been sold by Rotolite Corp., designated by Rotolite as Model "L" Diaz-Jet and Model "K" Mark II. Rotolite, as well as other manufacturers have published specifications and drawings for these print machines and it is not thought necessary to describe them in greater detail herein.

Also mounted on the table 12 adjacent to the print machine 10 is a tray assembly 20 including an originals/print-paper tray 22, a copies tray 24, and a telescoping support arm 26 which is attached to the lower edges of the originals/print-paper tray 22 and the copies tray 24.

The originals/print-paper tray 22 has a front wall 28, side walls 30, a rear wall 32, and a bottom wall 34. These walls define an envelope for receiving originals and print paper and holding them in a substantially vertical attitude. In this respect, it should be noted that the originals/print-paper tray 22 is sufficiently wide to hold an original blueprint-type trace, for example, without bending it. Further, the front wall 28 of the originals/print-paper tray 22 has a height such that the upper edge of a thusly contained, original trace is easily accessible to an operator at a mouth 35.

The originals/print-paper tray 22, in addition to defining an envelope for holding originals and print-paper sheets, includes side mounting supports 36 for mounting the envelope and for mounting adjustable guides 38a and 38b which guide originals ejected from the first outlet 16 back into the envelope of the originals/print-paper tray 22. The side mounting supports 36 have table-mounting flanges 40 extending normal to the main portion thereof for fastening the mounting supports 36 to the surface of the table 12 with screws or the like and envelope-mounting, coplanar, flanges 42 for attaching the mounting support 36 to the sidewalls 30 of the envelope.

The adjustable guides 38a and b are mounted on rods 44 which extend between the side mounting supports 36. In this respect, the adjustable guides 38a and b are attached to the rods 44 while the rods 44 are threaded on the ends thereof to engage wing nuts 46 which can be loosened or tightened to clamp the mounting supports 36 against the adjustable guides 38a and b to hold the adjustable guides 38a and b in stable positions.

In the preferred embodiment, the walls 28–34, the mounting supports 36 and the adjustable guides 38a and b are constructed of sheet material, such as plastic, however, they could also be constructed of cardboard, fiberboard, wire mesh, or the like. It is only necessary that the material used be somewhat rigid in order to hold the shapes depicted herein.

A flat, rigid, sheet-like separator 48 is positioned in the envelope of the originals/print-paper tray 22 to separate already-copied originals from other originals and print paper as is hereinafter described. The separator 48, in the preferred embodiment, is loosely held in the envelope so that it is freely movable between the front and rear walls 28 and 32, however, it could also be attached at its lower edge to the bottom wall 34 so long as its upper edge is movable between the front and rear walls 28 and 32.

The copies tray 24 is similarly constructed as the originals/print-paper tray 22 in that it has a front wall 50, side wall 52, a rear wall 54, and a bottom wall 56. In addition, the copies tray 24 has mounting supports 58 and adjustable guides 60 and 62. It should be noted that the top adjustable guide 60 is somewhat smaller than the lower adjustable guide 62, however, its principle is the same. In this respect, the adjustable guides 60 and 62 are similarly mounted with rods 64 and wing nuts 66 as are the adjustable guides 38a and b on the originals/print-paper tray 22. In this respect, however, there are a series of guide mounting holes 68 into which the rods 64 can be inserted for changing the positions of the rods.

The mounting supports 58 of the copies tray 24 also includes table-mounting flanges 70 and envelope-mounting flanges 72.

It can be seen in FIG. 1 that when the copies tray 24 is mounted on the table 12 adjacent to the print machine 10 a mouth 74 of an envelope formed by the front, side, rear, and bottom walls 50–58 is adjacent to the copies outlet 18 of the print machine 10. The adjustable guides 60 and 62 are positioned to guide copies ejected from the copies outlet 18 into the mouth 74.

As was mentioned above, the adjusting arm 26 is mounted at the lower edges 74 and 76 of the originals/print-paper tray 22 and the copies tray 24, respectively. By extending or contracting the adjusting arm 26, and by changing the location of the adjustable guide 62 between the guide-mounting holes 68, the tray assembly 20 can be made to fit various size support tables 12.

It should be noted that both of the trays 22 and 24 are substantially vertical which allows them to be positioned adjacent to the print machine 10, but yet they do not interfere with movement of an operator about, or access of an operator to, the print machine 10.

In operation, a stack 77 (FIG. 5) of original traces, to be copied with the print machine 10 are placed in the envelope of the originals/print-paper tray 22 immediately in front of the separator 48, facing the print machine 10, with the first original to be copied 77a being away from the print machine 10, or close to the operator. A stack 80 of print paper sheets is also placed in the envelope of the originals/print-paper tray 22 on the outside of the separator 48 and closer to the front wall 28 than the stack 77 of originals.

To initiate making a copy, the operator picks up the outside-most original 77a and a piece of print paper 80 at their top opposite corners and holds them together. The operator, pulls these two sheets out of the envelope of the originals/print-paper tray 22 and inserts the bottom edges 82 thereof into the first inlet 14 as is shown in FIG. 4. As the two sheets proceed through the exposure portion 19a of the print machine 10, the material on the original is exposed by the lamp 15 (FIG. 6) onto the print paper. Both the print paper and the original are ejected from the first outlet 16, with the print paper being on top and the original being on bottom, facing downwardly. The print paper is fed directly from the first outlet 16 into the second inlet 17, where it is processed by the developing portion 19b of the print machine 10 and ejected from the second outlet 18. The original is guided from the first outlet 16 into the mouth of the envelope of the originals/print-paper tray 22 behind (on the side close to the print machine 48) the separator 48 by the adjustable guides 38a and b. In this respect, the operator holds the separator 48 toward the front wall 28 so that the original returns to the envelope behind the separator 48. Each subsequent original, similarly, is guided behind the previous original so that the originals return to the same order and orientation as before they were copied. When an entire set of originals have been printed, the separator 48 can then be moved behind the originals for making another set of prints. The first set of prints may be removed from the print tray for binding without further collating or the like. In this respect, the prints or copies are deposited in the print tray 24, one on top of the other, in the same order as the originals are in the originals/print-paper tray 22.

It should be understood that the tray assembly of this invention allows the making of many copy sets of a single set of originals with very little lost motion and a minimum of collating and other unnecessary steps. In addition, the tray assembly of this invention maintains original traces during the copying thereof without creasing or otherwise damaging them.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

1. A tray assembly to be used with a print machine, of a type having an exposure portion, said exposure portion including a first inlet for receiving original traces and print paper sheets and a first outlet for ejecting said original traces and print-paper sheets from said exposure portion, and a developing portion, said developing portion including a second inlet for receiving exposed print paper sheets and a second outlet for ejecting developed print-paper sheets, said tray assembly including:
   an originals/print-paper tray; and
   a copies tray;
   said originals/print-paper tray defining a relatively flat envelope for holding originals to be copied and print paper on which said copies will be printed in a substantially vertical orientation, said envelope having a mouth at one edge thereof through which originals and print paper can be inserted into and removed from said envelope, said originals/print-paper tray including a mounting means for mounting said originals/print-paper tray adjacent to said print machine to have a substantially vertical orientation, said envelope mouth facing upwardly adjacent said first and second inlets of said print machine, said envelope being of a size for holding said originals and print paper with top edges thereof being adjacent said mouth;
   said copies tray defining a relatively flat copies envelope for receiving and holding said copies in an orientation tending toward a vertical, said copies envelope having a mouth at one edge thereof through which said copies can be received from said print machine and removed from said copies envelope by an operator, said copies tray including a mounting means for mounting said copies tray adjacent said print machine to have an orientation tending toward the vertical with said copies-envelope mouth facing upwardly adjacent said second outlet.

2. A tray assembly as in claim 1 wherein each of said mounting means are located at the upper edges of said trays for mounting said trays on a surface on which said print machine rests.

3. A tray assembly as in claim 2 wherein is further included a telescoping, adjustable arm attached between the lower edges of said originals/print-paper tray and said copies tray for providing support and for adjusting the distance between said trays.

4. A tray assembly as claimed in claim 1 wherein are further included adjustable guides mounted on said trays at the respective mouths thereof for guiding sheets received by said mouths from said print machine into said mouths.

5. A tray assembly as in claim 1 wherein is further included a rigid separator positioned in the envelope of said originals/print-paper tray, said separator being movable between front and rear walls of said envelope.

6. A tray assembly as in claim 5 wherein said separator is unattached to said originals/pring-paper tray.

7. A method of making copies of large sheets with a print machine of the type having an exposure portion, said exposure portion including a first inlet for receiving original traces and print paper sheets and a first outlet for ejecting said original traces and print-paper sheets from said exposure portion, and a developing portion, said developing portion including a second inlet for receiving exposed print paper sheets and a second outlet for ejecting developed print-paper sheets, said method comprising the steps of:
   placing the originals in a substantially vertically-oriented envelope having a mouth opening upwardly adjacent to said inlets of said print machine, said originals facing said print machine;
   placing a stack of print paper in said originals/print-paper envelope on the opposite side of said originals from the print machine;
   extracting an original to be copied and a sheet of print paper from said originals/print-paper envelope simultaneously and feeding the lower edge of said original and said sheet of print paper together into said first inlet of said print machine;
   upon its ejection from said first outlet, guiding said original back into said originals/print-paper envelope; and
   upon its ejection from said first outlet, guiding said print paper into said second inlet; and,
   upon its ejection from said second outlet, guiding said print paper into a separate, substantially vertical copies envelope.

* * * * *